United States Patent [19]

Ohkumo

[11] Patent Number: 4,825,991
[45] Date of Patent: May 2, 1989

[54] CONTROL SYSTEM FOR A CLUTCH FOR A VEHICLE

[75] Inventor: Hiroya Ohkumo, Tokyo, Japan
[73] Assignee: Fuji Jukogyo Kabushiki Kaisha, Tokyo, Japan
[21] Appl. No.: 43,432
[22] Filed: Apr. 28, 1987

[30] Foreign Application Priority Data

Apr. 30, 1986 [JP] Japan .................. 61-100322

[51] Int. Cl.⁴ .............. F16D 37/02; F16D 27/16; B60K 41/02
[52] U.S. Cl. .................. 192/0.052; 192/0.076; 192/21.5
[58] Field of Search .............. 192/0.076, 0.033, 21.5, 192/0.052

[56] References Cited

U.S. PATENT DOCUMENTS

| | | | |
|---|---|---|---|
| 4,623,052 | 11/1986 | Watanabe et al. | 192/21.5 |
| 4,665,773 | 5/1987 | Hiramatsu et al. | 192/0.076 X |
| 4,674,609 | 6/1987 | Sturges et al. | 192/0.076 X |
| 4,722,429 | 2/1988 | Kono | 192/0.033 |

FOREIGN PATENT DOCUMENTS

| | | | |
|---|---|---|---|
| 0151038 | 8/1985 | European Pat. Off. | |
| 0031729 | 2/1986 | Japan | 192/0.076 |

Primary Examiner—Rodney H. Bonck
Attorney, Agent, or Firm—Martin A. Farber

[57] ABSTRACT

A system for controlling an electromagnetic clutch for a motor vehicle at a transient state of a driving condition of the motor vehicle. An actual engagement rate (actual engagement ratio) is obtained in dependency on speeds of a drive member and a driven member of the clutch. A desired engagement rate (desired engagement ratio) of the clutch is provided in accordance with conditions of the transient state and driving conditions. Clutch current is controlled so as to converge the actual engagement rate to the desired engagement rate, allowing the clutch to slip in dependency on the transient state conditions.

13 Claims, 6 Drawing Sheets

CONTROL SYSTEM FOR A CLUTCH FOR A VEHICLE

BACKGROUND OF THE INVENTION

The present invention relates to a control system for an electromagnetic clutch for an automatic transmission of a motor vehicle.

An automobile provided with a continuously variable belt-drive transmission with an electromagnetic clutch is disclosed in EP-A 151038. The electromagnetic clutch of the transmission is controlled by a control system to provide various operational modes as steady state modes, such as a starting mode of a vehicle, reverse excitation mode, drag mode, and mode of lock-up engagement. One of the modes is selected in accordance with a position of a selector level and driving conditions to control the electromagnetic clutch.

Other prior art discloses control systems which provide transient state modes for various transient states. The transient states therein and herein include states at the changing of ranges, for example changes from a neutral range (N-range) or parking range (P-range) to drive range (D-range), high engine speed drive range (Ds-range) or reverse range (R-range), from the D-range to Ds-range, or reverse range (R-range), from the D-range to Ds-range, and at the changing of modes, for example changes from the starting mode to the lock-up engage mode. Further, the transient state mode includes operations such as releasing and depressing of an accelerator pedal in starting or lock-up engage mode. Herein the term "transient state" is defined to include any of the above. In the transient state mode, clutch torque is temporarily decreased to cause the clutch to slip so as to prevent a shock at the changing operation. The clutch torque is gradually raised thereafter. In another art, the clutch torque is varied with time in accordance with a particular characteristic.

However, the engagement rate of the clutch during driving of the vehicle does not solely depend on the clutch torque but also on the relationship between engine torque and torque-load on the clutch output shaft which depends on running resistance of the vehicle. Thus, it is difficult to cause the clutch to slip at optimum rate only by controlling the clutch torque. Accordingly, in the prior art, there remain driving condition regions where clutch torque does not provide desired engagement rates.

SUMMARY OF THE INVENTION

The object of the present invention is to provide a control system for a clutch where the clutch torque is controlled in accordance with the engagement rate to provide optimum transient state characteristics.

According to the present invention, there is provided a system for controlling a clutch for a motor vehicle comprising first means for detecting a transient state of driving condition of the motor vehicle and for producing a transient state signal, second means responsive to the transient signal for detecting speed of a drive member of the clutch and speed of a driven member of the clutch, third means for producing an actual engagement rate dependent on the speeds of the drive and driven members, fourth means for controlling clutch torque based on the actual engagement rate so as to slip the clutch in dependency on the transient state.

In an aspect of the invention, the system further comprises fifth means for providing a desired engagement rate of the clutch in accordance with the speeds of the drive member and driven member, and the fourth means operative to control the clutch torque so as to converge the actual engagement rate to the desired engagement rate.

The other objects and features of this invention will become understood from the following description with reference to the accompanying drawings.

DETAILED DESCRIPTION OF THE PREFERRED EMBODIMENT

Figure 1:
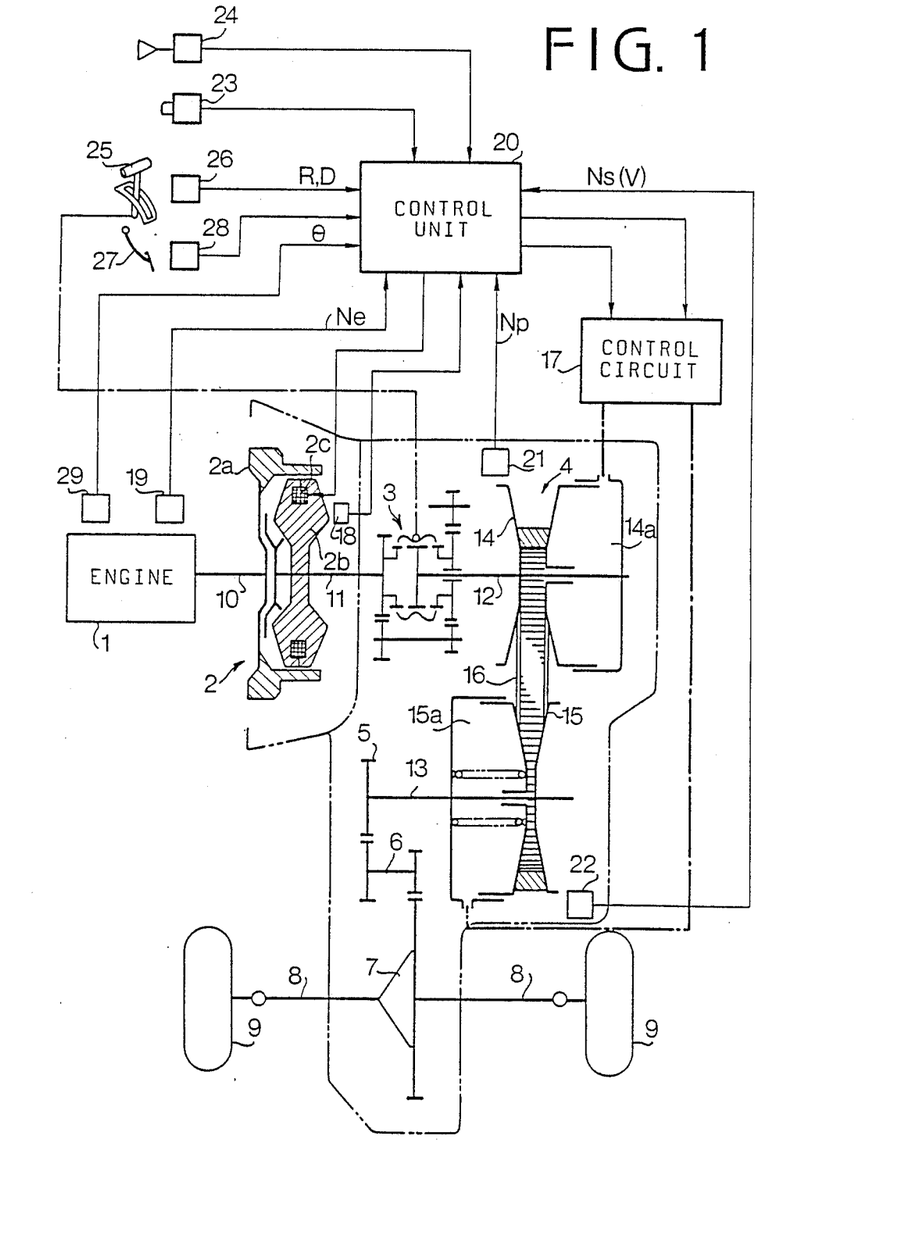
FIG. 1 is a schematic illustration of a control system for an electromagnetic clutch for a motor vehicle.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive automatic transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to crankshaft 10 of the engine 1, a driven member 2b secured to an input shaft 11 of the transmission 4, and a magnetizing coil 2c provided in the driven member 2b. Magnetic powder material is provided in a gap between the drive member 2a and driven member 2b. When the magnetizing coil 2c is excited by the clutch current, the driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive automatic transmission 4, the selector mechanism 3 is provided between the input shaft 11 and a main shaft 12. The selector mechanism 3 is provided with a synchromesh mechanism comprising gears, hub, and a sleeve for connecting the input shaft 11 and the main shaft 12 to selectively provide a driving position (D-range), high engine speed driving position (Ds-range) and a reverse driving position (R-range).

The continuously variable belt-drive automatic transmission 4 has the main shaft 12 and an output shaft 13 provided in parallel with the main shaft 12. A drive pulley 14 is provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. Hydraulic cylinders 14a and 15a are communicated with an oil hydraulic control circuit 17. The hydraulic control circuit 17 is responsive to vehicle speed, engine speed and throttle valve position for controlling the amount of oil supplied to the cylinders 14a and 15a. The pulleys 14 and 15 are operated by compressive forces of in the cylinders so that the running diameter of belt 16 is varied to infinitely change the transmission ratio.

An electronic control system for the clutch 2 and the belt-drive automatic transmission 4 has an engine speed sensor 19, and rotating speed sensors 21 and 22 for respectively sensing speeds of the drive pulley 14 and the driven pulley 15. A choke switch 24 produces an output signal when a choke valve of the engine 1 is closed, and an air conditioner switch 23 produces an output signal during the operation of an air conditioner. A selector lever 25 connected to the selector mechanism 3 is provided with a select position sensor 26 for sensing the drive positions D and $D_S$ and the reverse position R. An accelerator pedal switch 28 is provided for sensing the depression of an accelerator pedal 27, and a throttle position sensor 29 is provided. A driven member speed sensor 18 for sensing the speed of the driven member 2b of the clutch 2 is further provided.

Output signals of the sensors and pulses of the switches are applied to an electronic control unit 20 which produces a clutch current control signal to the clutch 2 and a control signal for controlling the transmission ratio (i) of the transmission and a line pressure control signal to the control circuit 17.

Figure 2A:
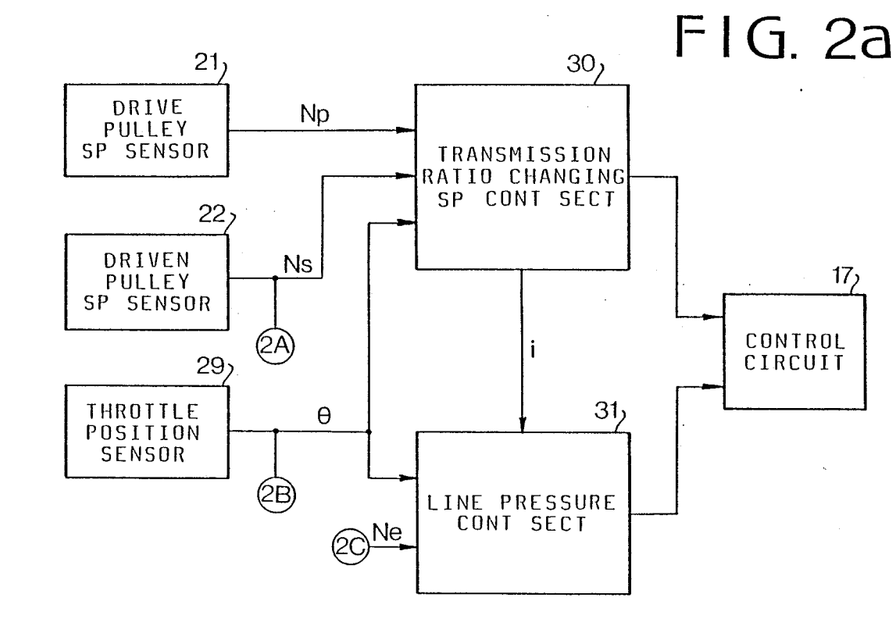
FIGS. 2a and 2b show a block diagram of a control unit according to the present invention.
Figure 2B:
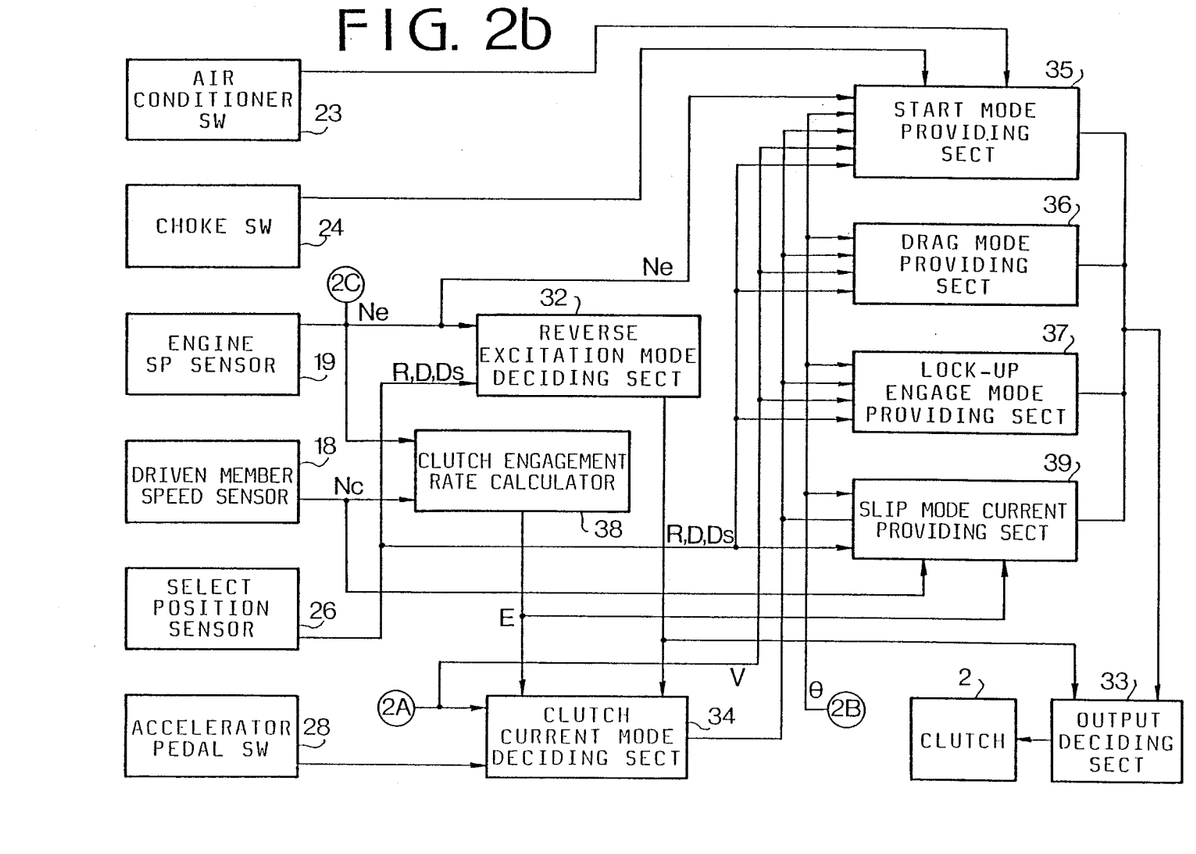

Referring to FIGS. 2a and 2b showing the control unit 20 of FIG. 1, a transmission ratio changing speed control section 30 is applied with a drive pulley speed signal $N_P$ of the sensor 21, driven pulley speed signal $N_S$ of the sensor 22, and throttle position signal $\theta$ of the sensor 29 to produce the transmission ratio control signal dependent on a transmission ratio changing speed (rate) di/dt. A line pressure control section 31 is applied with an engine speed signal Ne of the sensor 19, throttle position signal $\theta$ of the sensor 29, and an actual transmission speed ratio signal i ($N_S/N_P$) of the transmission ratio changing speed control section 30 to produce the line pressure control signal dependent on a desired line pressure. These control signals are applied to the control circuit 17 to control the transmission ratio and line pressure of the transmission 4.

A reverse excitation mode deciding section 32 is applied with the engine speed signal Ne of the sensor 19 and drive position signals of the select position sensor 26. When the engine speed Ne is below 300 rpm, or the selector lever 25 is at a neutral position (N-range) or a parking position (P-range), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from driven pulley speed sensor 22 for deciding driving conditions such as starting mode to produce output signals. The output signals are applied to a start mode providing section 35, drag mode providing section 36, and clutch lock-up engage mode providing section 37.

The start mode providing section 35 decides clutch current of a starting characteristic dependent on the engine speed Ne at an ordinary start or at closing of the choke switch 24 or air conditioner switch 23. The starting characteristic is corrected by signals from the throttle valve opening degree $\theta$, vehicle speed V, and driving positions of the D-range, $D_S$-range and R-range.

The drag mode providing section 36 decides a small drag current when the accelerator pedal 27 is released at a low speed in each drive position for providing a drag torque to the clutch 2 for a smooth start of the vehicle.

Figure 3:
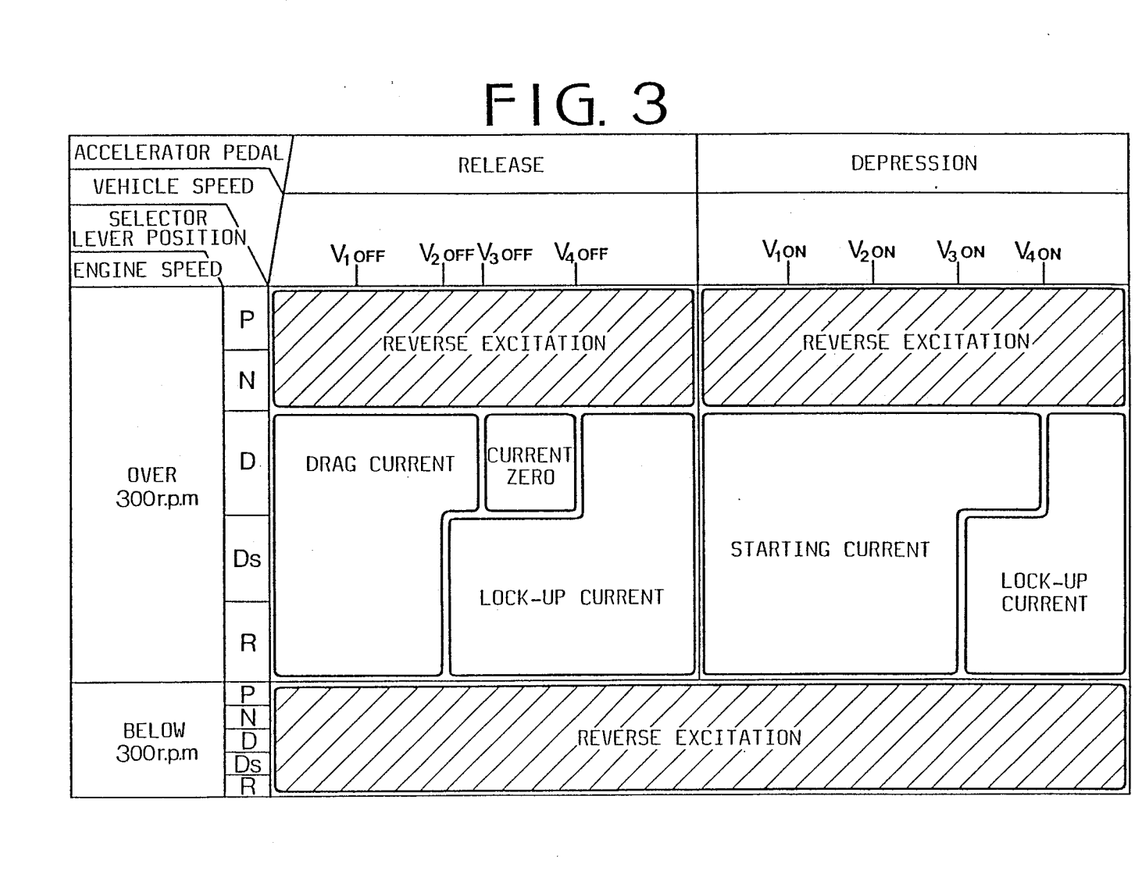
FIG. 3 is a graph showing regions of various modes.

The clutch lock-up engage mode providing section 37 decides a lock-up current in response to the vehicle speed V and throttle opening degree $\theta$ at each drive position for entirely engaging the clutch 2. Outputs of sections 35, 36 and 37 are applied to the output deciding section 33 to control the clutch current. A range of each mode is shown in FIG. 3.

In addition, a clutch engagement rate calculator 38 is further provided in the control unit 20 for transient state modes. At the clutch engagement rate calculator 38, which is applied with the engine speed Ne and a driven member speed Nc of the sensor 18, the calculation of engagement ratio (hereinafter referred to as engagement rate) E is made by E=Nc/Ne. When E=1, the clutch is locked-up. When the rate E is smaller than 1 (E<1), it means that the engine speed Ne is faster than the drive member speed Nc (Ne>Nc), i.e., slipping of the clutch. On the other hand, when the rate E is larger than 1 (E>1), the engine speed Ne is smaller than the driven member speed Nc (Ne<Nc), which means that the torque is transmitted from wheels of the vehicle to the engine. Thus, the clutch is also in a slipping state.

The output signal of the clutch current mode deciding section 34, signals E Nc, R, D, Ds and $\theta$ are applied to a slip mode current providing section 39 which operates to detect the transient state which the vehicle is in. The slip mode providing current section 39 is further applied with the engagement rate signal E. The slip mode current providing section 39 has an Ner-$\theta$ table storing values of desired engine speed Ner dependent on the throttle position signal $\theta$ at the release of the clutch. A desired engagement ratio (hereinafter referred to as desired engagement rate) Eo is set so as to provide an optimum slipping of the clutch in accordance with the particular transient state mode, elapsed time after the start of the transient mode and driving conditions. The slip mode current providing section 39 provides an appropriate clutch current so that the actual engagement rate E coincides with the desired engagement rate Eo.

The operation of the control system is described hereinafter. At the starting of the vehicle, when the accelerator pedal is depressed while the select lever 25 is positioned at D-range, the start mode providing section 35 is selected. Accordingly, the clutch torque increases with clutch current in proportion to the engine speed. When the vehicle speed reaches a clutch engaging speed $V_4$ shown in the right hand side of FIG. 3, the lock-up engage mode providing section 37 is selected to lock-up the clutch.

Figure 4:
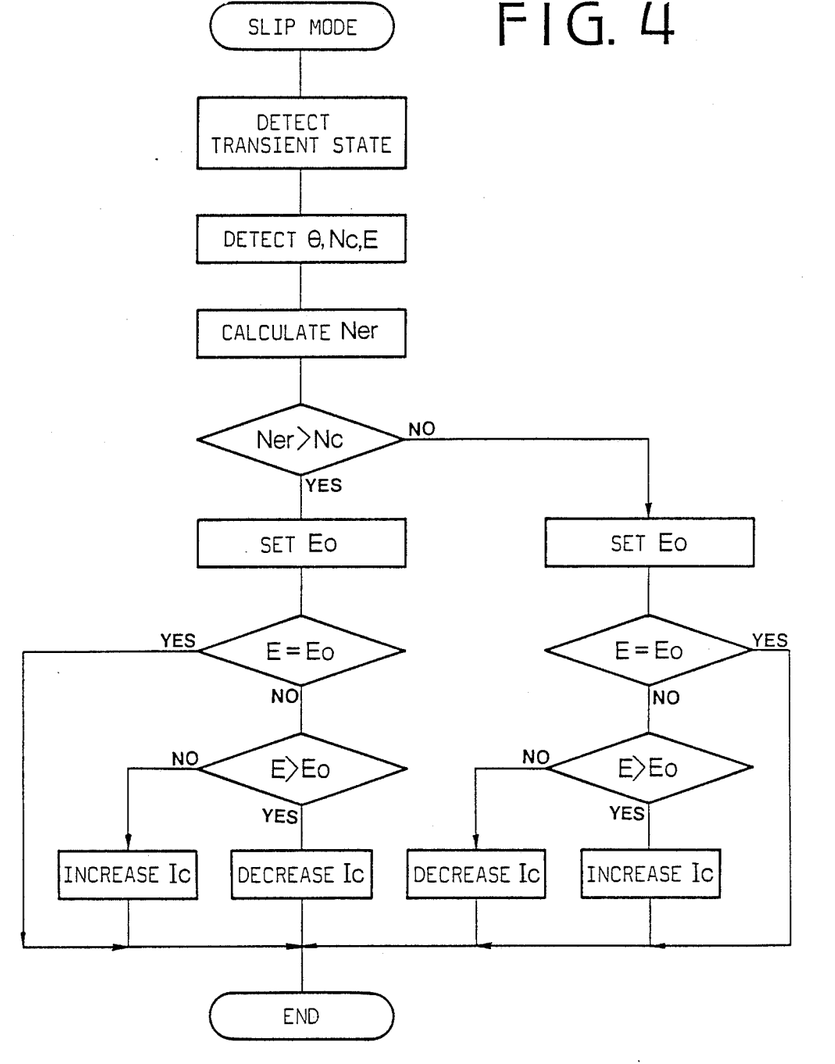
FIG. 4 is a flow chart showing the operation of the system.

The operation of the control system in the transient state mode when the position of the selector lever 25 is shifted for example from the D-range to the Ds-range during the lock-up engagement of the clutch, is described hereinafter with reference to a flowchart in FIG. 4.

At the shifting of the D-range to the Ds-range, slip mode is selected. The transient state mode from D-range to Ds-range is detected at the slip mode current providing section 39. The desired engine speed Ner at the throttle position $\theta$ at the release of the clutch is derived from the Ner-$\theta$ table. When the value of Ner is larger than the driven member speed Nc (Ner>Nc), the desired engagement rate Eo is set for example as shown by the solid line in FIG. 5. Namely, the desired engagement rate Eo decreases to 0.7. The desired engagement rate Eo for the detected transient state is set so as to temporarily increase the slipping of the clutch in order to absorb the shock which occurs when the vehicle power on the engine suddenly increases at the Ds-range, and to gradually decrease the slipping (increase Ic) until the clutch is locked-up again.

Figure 5:
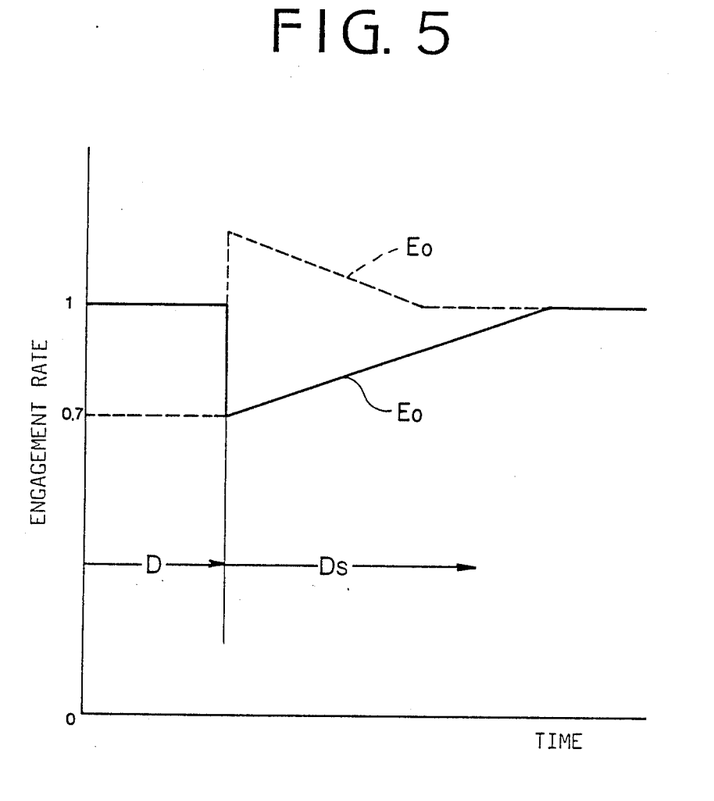
FIG. 5 is a graph showing characteristics of clutch engagement rates.

The actual engagement rate E is compared with the desired engagement rate Eo. The program is terminated if E is equal to Eo. When the actual rate E is larger than the desired rate Eo, the clutch current Ic is reduced to increase the slipping. When the actual rate E is smaller than the desired rate Eo, the clutch current Ic is increased to decrease the slipping. Thus, the engagement of the clutch 2 varies in accordance with the desired engagement rate Eo.

If the value of Ner is smaller than Nc (Ner<Nc), the desired engagement rate Eo is set as shown by the dotted line in FIG. 5. The actual engagement rate E is compared with the desired engagement rate Eo. The program is terminated if E is equal to Eo. When the actual rate E is larger than the desired rate Eo, the clutch current Ic is increased to decrease the slipping. When the actual rate E is smaller than the desired rate Eo, the clutch current Ic is reduced to increase the slipping. Thus, the engagement of the clutch 2 varies in accordance with the desired engagement rate Eo.

It is understood that the clutch is controlled in a similar manner in other transient state modes, and that the present invention may be applied to other automatic clutches besides an electromagnetic clutch.

According to the present invention, the clutch torque is controlled in the transient state modes by varying engagement rate of the clutch. Accordingly, the clutch is controlled with an appropriate slipping characteristic at any driving condition thereby avoiding excessive or insufficient slipping. Thus, shock is effectively absorbed or entirely prevented.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling a clutch for a motor vehicle comprising:
   first means for detecting a transient state of driving condition of the motor vehicle and for producing a transient state signal;
   second means for determining speed of a drive member of the clutch and speed of a driven member of the clutch;
   third means for calculating an actual engagement rate of the clutch as the ratio of the speeds of the drive and driven members;
   fourth means responsive to the transient signal for controlling torque of the clutch so that the actual engagement rate follows a desired varying engagement rate causing the clutch to slip in dependency on the transient state.

2. The system according to claim 1, further comprising
   fifth means for providing said desired engagement rate of the clutch,
   the fourth means being operative to control the clutch torque so as to converge the actual engagement rate to the desired engagement rate.

3. The system according to claim 2, wherein
   said fifth means provides said desired engagement rate as a predetermined function of the particular transient state, and driving conditions at the time.

4. The system according to claim 2, wherein
   said fifth means provides said desired engagement rate as a predetermined function of the particular transient state, driving conditions at the time, and time after initiation of the transient state.

5. The system according to claim 1, wherein
   the clutch is an electromagnetic clutch and said fourth means controls current passing in a coil of the electromagnetic clutch.

6. The system according to claim 1, wherein
   said desired engagement rate equals unity after the transient state ceases.

7. The system according to claim 1, wherein
   the transient state comprises shifting from one gear to another.

8. The system according to claim 1, further comprising
   means for releasing the clutch at initiation of the transient state,
   said second means determines the speed of the drive member at release of the clutch by a table stored with values of speed of the drive member as a function of degree of opening of a throttle valve of an engine of the motor vehicle.

9. In a system for controlling clutch current of an electromagnetic clutch for a motor vehicle having an engine connected to the clutch, and a transmission for transmitting power of the engine through an output member of the electromagnetic clutch to axles of vehicle driving wheels, the system including a throttle position sensor for detecting a throttle valve opening degree of the engine and for producing a throttle position signal representative of the throttle valve opening degree, an output member speed sensor for detecting speed of the output member and for producing an output member speed signal representative of the output member speed, and an engine speed sensor for detecting engine speed and for producing an actual engine speed signal representative of the engine speed, the improvement of the system which comprises:
   clutch engagement rate deciding means responsive to the output member speed signal and the actual engine speed signal for calculating an actual engagement rate signal,
   transient state detecting means responsive to changing of at least one of operating conditions of the engine, the electromagnetic clutch and the transmission for producing a transient state signal;
   desired engine speed calculating means responsive to the transient state signal and the throttle position signal for producing a desired engine speed signal;
   desired clutch engagement rate deciding means responsive to a difference between the desired engine speed signal and the output member speed signal for producing either of a first desired engagement rate characteristic signal and a second desired engagement rate characteristic signal;
   correcting means responsive to either of the first and second desired engagement rate characteristic signals and to the actual clutch engagement rate signal for correcting the clutch current, so as to control the clutch current to converge the actual engagement rate to either of the first and second desired engagement characteristic signals respectively.

10. The system according to claim 9, wherein the transient state detecting means is provided for detecting at least one of changing from one of a neutral range and parking range to one of drive range and high engine speed range and a reverse range, and changing from the drive range to the high engine speed range of the transmission.

11. The system according to claim 9, wherein the transient state detecting means is provided for detecting changing from a starting mode to a lockup engage mode of the electromagnetic clutch.

12. The system according to claim 9, wherein the transient state detecting means is provided for detecting releasing and depressing of an accelerator pedal during driving of the vehicle.

13. The system according to claim 9, wherein the desired clutch engagement rate deciding means is provided for producing the second desired engagement characteristic signal when the desired engine speed signal is smaller than the output member speed signal in value.

* * * * *